United States Patent Office 3,567,464
Patented Mar. 2, 1971

3,567,464
METHOD FOR PREPARING A REASSEMBLED UNITARY MEAT PRODUCT
Edd O. Stallons, Westchester, Ill., assignor to Armour and Company, Chicago, Ill.
No Drawing. Filed Mar. 24, 1967, Ser. No. 625,611
Int. Cl. A22c 18/00
U.S. Cl. 99—107     3 Claims

ABSTRACT OF THE DISCLOSURE

This invention relates to a new reassembled unitary meat product and method for preparing the same from an individual piece or pieces of meat. The process generally comprises the steps of scoring pieces of meat to a depth substantially below their surface, holding the meat for a sufficient time to permit the release of meat juices and to increase the adhesiveness of the juices, rescoring the portion of the meat previously scored, and pressing the meat together into the desired form of the meat product until the meat is bound together as one cohesive mass.

BACKGROUND OF THE INVENTION

Meat products such as roasts, cooked hams, logs, and the like which have been reassembled from an individual piece or pieces of meat are generally prepared by tying the meat together with a cord to form the desired unitary shape, or by pressing the meat together into the unitary shape and cooking to release the juices containing adhesive proteins and bind the meat together.

It is known that the amount of such adhesive protein can be increased with a resultant increase in binding if the surface of the meat is first roughened by a multiplicity of slits or cuts, or if an edible salt is applied to the surface of the meat.

The difficulty with the meat products produced by such methods is that after cooking they still tend to crumble or fall apart when sliced. The release of adhesive proteins in the juices during cooking does result in some binding at the surface of the meat where it is pressed together, but it is not sufficient to prevent the meat product from falling apart on being sliced where the meat was originally pressed together. Another objection is that during cooking much of the natural juices of the meat are "cooked-out" or purged which thereby detracts from the tenderness, flavor, juiciness and nutritive value of the meat.

SUMMARY OF THE INVENTION

It is therefore an object of the present invention to provide a new reassembled unitary meat product that will remain unitary and not fall apart or crumble when being sliced.

Another object of the present invention is to provide a new reassembled unitary meat product that will lose less of its natural juices due to cooking and thereby result in a cooked product that is more juicy, tender, and flavorful.

Other objects and advantages of the invention will become apparent as the specification proceeds.

I have discovered that a new reassembled unitary meat product having the above-stated advantages can be prepared by scoring the meat to a depth substantially below the surface thereof, holding the meat a sufficient time to permit the release of meat juices and to increase the adhesiveness of the juices, rescoring the portion of the meat previously scored, and pressing the meat together into the desired shape to cause the adhesive proteins to bind the meat together.

DESCRIPTION OF THE PREFERRED EMBODIMENTS

In the preferred embodiment of this new meat product and process, the meat is scored to the approximate center of the piece or pieces to rupture a great number of cells and thus release a substantial amount of juice to the surface of the meat for binding. The scores are preferably spaced at intervals of about ⅛ to ¼ of an inch which has been found to be about as close an interval as can be tolerated to maximize the rupturing of the cells without running the risk of mangling the meat beyond use.

The exact depth of the scores is not critical and any depth that is substantially below the surface of the meat is within the scope of the present invention. Optimum results, however, have been achieved when the scores reach the approximate center of the meat.

Any suitable means such as a knife, rotary blade or the like, can be used to score the meat but I prefer to use the particular rotary blade and assembly thereof as described in my aforementioned copending application filed simultaneously herewith.

Following the aforesaid scoring operation the meat is preferably held at a temperature of 18 to 25° F. and for a period of about 12 to 24 hours to permit the further release of juices to the meat surface and to allow the juices to reach their optimum adhesiveness. The period of 12 to 24 hours was found to give the best results for cooked hams in terms of sliceability (non-crumbling or falling apart) and the amount of juice retained by the meat but this optimum period will not necessarily be the same for other meats. Furthermore, food products made after being held for periods under and over the preferred range were also found to be very acceptable although the sliceability and amount of juice retention was not quite as favorable as those products held for a time falling in the optimum range. Thus the invention is not limited to any particular holding period but comprehends any period that is sufficient to permit the further release of juices and to the increase of the adhesiveness thereof.

During this time period the meat is preferably held at a temperature range of about 18 to 25° F. Meat products held within this temperature range were found to be generally consistent as to sliceability and juice retention, and did not result in any freezing of the juices. Temperatures below this range would not be practical as there is likely to be some freezing of the juices unless the freezing point is lowered by the addition of salt or by other means. Temperatures above the preferred range resulted in meat products that were not consistent in terms of slicing qualities and juice retention but nevertheless still yielded products that were acceptable and an improvement over food products made by conventional methods. The invention is therefore not confined to this preferred temperature range but comprehends any holding temperature, short of cooking, that will allow the further release of juices and increase the adhesiveness thereof.

Following the holding period, a second scoring operation is performed on the meat on the portion originally scored. The scored surfaces have a tendency to reseal during the holding period due to the adhesiveness developed at the surface of the meat and the rescoring step is needed to reopen the scores on the meat surface so the adhesive proteins trapped below the resealed surface may flow freely to the surface during the subsequent cooking step which will bind the meat into one cohesive mass.

Since the tendency of the scored surface to reseal is greatest at and near the surface of the meat, the depth of the rescores need not reach the same level as the original scores and it is sufficient if a depth is reached which will at least go far enough below the surface of the meat where the tendency to reseal is greatest.

After being rescored, the meat is reassembled and pressed together into the shape of the desired meat product. In the case of chunks of meat such as beef which are tied together with a cord to form a roast, the individual pieces of beef are pressed together at their scored surfaces which will maximize the amount of adhesion between the pieces. A meat product such as a rolled roast made from a single strip of beef which is rolled up on itself will have a scored surface pressed against an unscored surface. The adhesion produced thereby will not be as great as when the scored surfaces are pressed together but is still an improvement over existing procedures and is within the scope of the invention.

When the meat product is subsequently cooked, the adhesive proteins become coagulated and completely bind the meat together. When such a cooked product is afterward sliced, and the slices examined, neither the interfaces of the original pieces, nor the scores can be discerned, and when the slices are pulled apart, the separations have been seen to occur at fatty seams or in areas other than where the pieces were bound together. Thus when the meat product of the invention is sliced after being cooked, there will be no crumbling or falling apart of the slices and any crumbling or falling apart that does occur will be from defects inherent in the meat.

It has also been found that after cooking, there is considerably less cook-out of the natural meat juices than has heretofore been experienced with meat products produced by conventional procedures. This results in a product which is correspondingly richer in nutrients and much more juicy, flavorful, and tender.

This invention is applicable generally to any type of meat from livestock such as hogs, cattle, lamps, poultry and the like, which are regularly slaughtered, processed and sold for their meat.

EXAMPLE I

Thirty cooked hams were prepared by the process of the invention. Boneless uncooked whole hams were pumped with a curing solution and held for three days after which each ham was separated into major ham muscles. One of these muscles is the so-called cushion muscle and was used to prepare all thirty of the cooked hams.

The flat side of the cushion muscle was scored to a depth ranging from ¼ to 1¼ inches because of the irregular thickness thereof and corresponded to a depth that reached the approximate center of each muscle. The scores were spaced at intervals of about ⅛ to ¼ of an inch for the length of the muscle.

The muscles were then held at 18 to 25° F. and from 4 to 22 hours to permit the protein juices to be released and reach various degrees of adhesiveness.

Following this holding period the muscles were scored again and in the same manner as described for the initial scoring step. Two of the muscles were then pressed together at their scored surfaces to form the desired shape of the final product and cooked at 155° F. for five hours and in the conventional manner to yield a cohesive unitary cooked ham.

Each ham was weighed before and after cooking and the weights were compared to determine the amount of juice that was cooked-out. The results are tabulated below and expressed as percent of the original weight that is left after cooking and referred to as percent yield.

| Holding time, hours | Minimum yield, percent | Maximum yield, percent | Average yield, percent |
| --- | --- | --- | --- |
| 4 | 93.9 | 94.3 | 93.9 |
| 6 | 93.3 | 94.8 | 93.7 |
| 8 | 94.8 | 95.9 | 94.5 |
| 10 | 93.8 | 94.3 | 94.0 |
| 12 | 95.9 | 96.9 | 96.0 |
| 14 | 94.8 | 96.4 | 95.5 |
| 16 | 95.4 | 96.4 | 95.8 |
| 18 | 93.3 | 94.3 | 93.9 |
| 20 | 94.3 | 95.9 | 95.0 |
| 22 | 95.4 | 95.9 | 95.0 |

It will be noted that the optimum yield was for muscles that were held from 12 to 22 hours. The hams in this holding range were also found to possess the best adhesion as tested by thinly slicing the cooked ham and observing the amount of crumbling, if any, and observing where the crumbling occurred in the slice.

EXAMPLE II

An additional number of cooked hams were prepared by the method as set forth in Example I except that the cushion muscles were not scored or held for any period before being pressed together and cooked. The results are summarized as follows: Holding time, 0; minimum yield, 90.0; maximum yield, 94.3; average yield, 91.7.

The method of this example is generally the same as the method in which cooked hams are conventionally prepared and it will be noted that percent yield is considerably less than the yield obtained by the method of the invention as demonstrated in Example I. The adhesiveness of the cooked product was also found to be very poor as the ham readily crumbled and fell apart at the interface of the muscles which was readily discernible when the ham was sliced.

EXAMPLE III

An additional number of cooked hams were prepared by the method as set forth in Example I except that the cushion muscles were not held after being scored and were not rescored. The results are summarized as follows: Holding time, 0; minimum yield, 92.7; maximum yield, 95.3; average yield, 94.0.

It should be noted that the yield is considerably better when compared to the conventional method as shown in Example II but did not reach the higher yields of the optimum range of Example I. The adhesion of the muscles was good but not as good as the adhesion of the muscles held in the optimum range as there was a tendency to fall apart at the interface of the muscles when the ham was sliced.

EXAMPLE IV

A further number of cooked hams were prepared by the method as set forth in Example I except that the muscles were held for 48 hours and at 34 to 36° F. The results are summarized as follows: Holding time, 48; minimum yield, 90.7; maximum yield, 95.8; average yield 93.7.

It should be noted that the yield is considerably better when compared to conventional methods as shown in Example II but did not reach the higher yields as found in the optimum range of Example I. Adhesion of the muscles was also found to be poor as slices of the cooked ham tended to fall apart at the interface of the muscles when the ham was sliced.

EXAMPLE V

A further number of cooked hams were prepared by the method as set forth in Example I except that the muscles were held for 24 to 36 hours. The results are summarized as follows: Holding time, 24–36; minimum yield, 92.1; maximum yield, 96.7; average yield, 94.5.

The yield is considerably better than that attained by conventional methods as shown in Example II and was only slightly less than the yields of the optimum range of Example I. The adhesion of the muscles was found to be comparable to the adhesion obtained in the optimum range of the Example I products.

EXAMPLE VI

A further number of cooked hams was prepared by the method as set forth in Example I except that the muscles were only scored to a depth of about one quarter of their thickness and were held for 18 to 22 hours before being rescored. The results are summarized as follows: Holding time, 18 to 22 hours; minimum yield, 92.6; maximum yield 94.7; average yield, 93.8.

This yield is also considerably better when compared to the conventional method of Example II but did not reach the higher yields as found in the optimum range of Example I. The adhesion of the muscles was good but not quite as good as adhesion of the muscles of the optimum range as there was a slight tendency to fall apart at the interface of the muscles when the ham was sliced.

It must therefore be understood that while the optimum range shown herein for purposes of the disclosure is at present considered to be the preferred embodiment of the invention, the invention is intended to cover all changes and modifications in all the disclosed embodiments which fall within the spirit and scope thereof.

What is claimed is:
1. In a process for preparing a reassembled unitary meat product from an individual piece or pieces of meat, the steps of:
   (a) scoring said meat to a depth substantially below the surface thereof, said scoring being spaced at intervals of ⅛ to ¼ of an inch;
   (b) holding said scored meat at a temperature of 18–25° F. for a period of 12 to 24 hours to permit the release of meat juices and to increase the adhesiveness thereof;
   (c) rescoring the portion of said meat previously scored to reopen scores which have been resealed by the adhesiveness developed by the meat juices on the surfaces of the meat during the holding period; and
   (d) pressing said meat together at the scored surfaces thereof.
2. The process of claim 1 comprising the step of cooking until said meat adheres together to form said unitary meat product.
3. The process of claim 2 wherein said meat is ham.

References Cited
UNITED STATES PATENTS

| | | | |
|---|---|---|---|
| 2,310,067 | 2/1943 | Doering et al. | 99—107X |
| 2,868,650 | 1/1959 | Hammerberg | 99—107 |
| 3,076,713 | 2/1963 | Maas | 99—107 |
| 3,238,046 | 3/1966 | Komarik | 99—107 |

HYMAN LORD, Primary Examiner